(12) United States Patent
Weiss

(10) Patent No.: US 6,193,320 B1
(45) Date of Patent: Feb. 27, 2001

(54) PLAY-ELIMINATING WHEEL FITTING

(76) Inventor: Wolfgang Weiss, Daimlerstr. 15, D-85521 Ottobrunn (DE)

( * ) Notice: Subject to any disclaimer, the term of this patent is extended or adjusted under 35 U.S.C. 154(b) by 0 days.

(21) Appl. No.: 09/269,413
(22) PCT Filed: Sep. 17, 1997
(86) PCT No.: PCT/EP97/05103
  § 371 Date: Oct. 22, 1999
  § 102(e) Date: Oct. 22, 1999
(87) PCT Pub. No.: WO98/13220
  PCT Pub. Date: Apr. 2, 1998

(30) Foreign Application Priority Data

Sep. 26, 1996 (DE) .............................. 196 39 729

(51) Int. Cl.[7] .................................................. B60B 27/06
(52) U.S. Cl. ..................................... 301/35.63; 301/35.58
(58) Field of Search ........................... 301/35.55, 35.58, 301/35.62, 35.63, 105.1

(56) References Cited

U.S. PATENT DOCUMENTS

| | | |
|---|---|---|
| 1,464,812 * | 8/1923 | Fine .................................. 301/35.58 |
| 1,583,043 * | 5/1926 | Howard ............................. 301/35.58 |
| 1,737,332 * | 11/1929 | Pugh et al. ..................... 301/35.58 X |
| 1,901,078 | 3/1933 | Bourdon . |
| 2,906,558 * | 9/1959 | Forbuch ............................. 301/35.63 |
| 3,154,348 | 10/1964 | Hibbard . |
| 5,211,448 | 5/1993 | Hayashi . |
| 5,584,537 | 12/1996 | Miansian . |

FOREIGN PATENT DOCUMENTS

| | | |
|---|---|---|
| 93 13 244 | 11/1993 | (DE) . |
| 536941 | 5/1922 | (FR) . |
| 439371 * | 12/1935 | (GB) ................................ 301/35.58 |

* cited by examiner

Primary Examiner—Russell D. Stormer
(74) Attorney, Agent, or Firm—Burns, Doane, Swecker & Mathis, L.L.P.

(57) ABSTRACT

A wheel assembly includes a wheel hub mounted to a wheel mount. The hub and mount include intermeshing profiles in the form of teeth for transmitting torque from the mount to the hub about a longitudinal axis. The teeth on each of the hub and mount project in an axial direction and are circumferentially spaced apart. The teeth are wedge-shaped, as viewed in longitudinal section, to radially center the hub about the longitudinal axis.

9 Claims, 3 Drawing Sheets

PLAY-ELIMINATING WHEEL FITTING

BACKGROUND OF THE INVENTION

This invention concerns a wheel mounting for vehicles with a wheel rim having a tire and being attachable by means of preloading means to a shaft that has a wheel mount and is mounted so it can rotate in the wheel carrier, and having means for a positive-locking transmission of torque and shear force, where the means transmitting the torque and shear force is formed by a profiling that is provided on the wheel rim and wheel mount and being engageable in a positive-locking manner without backlash centering the wheel rim and completely taking up the preload force.

In the case of motor vehicles, the wheels, i.e., the wheel rims are usually detachably attached to a wheel mount by means of bolts relative to the rotating shaft or wheel axle.

There are known attachments which are formed by several bolts arranged on a common pitch circle on the wheel mount, passing through corresponding holes in the wheel rims. The radial centering of the wheel rim relative to the wheel mount is accomplished here by a shoulder on the wheel mount and the peripheral centering due to the conical areas of the fastening bolts or nuts which work together with corresponding conically shaped seating areas on the through-holes in the wheel rim.

The torques will be transmitted from the wheel rim over the conical areas of the bolts or nuts to the bolts in addition to the force locking produced by the surface pressure and subsequently to the wheel mount by positive fit.

A disadvantage of this arrangement is the plurality of fastening elements (threaded studs with nuts, or bolts) and the possible assembly positions, predetermined precisely by the number of fastening points (large assembly angles) which prevents rapid and simple handling, especially in the scope of car racing.

Especially in the domain of circuit racing, wheel mountings whose wheel mounts have a central threaded bolt as the mounting, are used. The wheel is thus attached to the wheel mount by a central nut. Axially projecting transmission pegs are arranged on a common pitch circle in the wheel mount or the wheel rim to transmit the torque and engage in corresponding openings in the wheel rim or wheel mount, respectively, in a positive-locking manner. Defined assembly angles of the wheel on the wheel mount are naturally determined by the number of transmission pegs, which is adverse to easy handling and ultimately also precludes short installation time - the possible position for attachment must first be located in each case. To permit quick and easy fit of the wheel on the transmission pegs, the latter must also have clearance to a certain extent with regard to their accommodating holes in the wheel rim or in the wheel mount. This clearance generates a backlash in the transmission of torque, which leads to continuous torsion under alternating loads, e.g., with an axle that is both driven and also braked. Therefore, the transmission pegs can rapidly wear out the accommodating holes, especially with the preferred use of lightweight metals, i.e., softer materials.

The relative movement between the wheel rim and the wheel mount can be counteracted only to a limited extent and then only by a significant tightening moment of the central nut due to force locking between mating plane surfaces of the wheel rim and the wheel mount. Furthermore, with this proposed solution and with a relative movement of the wheel rim to the wheel mount, the fastening nut must be secured to a particular extent to prevent it from loosening, which results in an extended effort.

It is also known that the wheel rim can be provided with flutes that work together with the wheel mount, which is designed as a splined shaft in a manner suitable for transmitting torque. The disadvantages of this solution are similar to those in the example described previously; namely, the wheel rim can be mounted only in the angle positions defined by the number of splines/flutes. To facilitate or permit mounting of the wheel rim on the mounting bolts, a certain clearance is absolutely essential, resulting in the disadvantages described above.

OBJECTS AND SUMMARY OF THE INVENTION

The purpose of this invention is to create a centered and reproducible mounting between the wheel mount and wheel (wheel rim) that is free of backlash and does not possess the disadvantages mentioned above in combination with the advantages of a central attachment. The wheel mounting according to this invention is suitable for transmitting high torques and fulfills highest demands regarding precision in concentric running at a comparatively low manufacturing expense. Mounting and positioning the wheel is extremely simple and uncomplicated, because the wheel is necessarily guided into the intended position due to the predetermined and closed pitch profiling. The wheel mounting according to this invention can be implemented without the need of substantial changes to the effected suspension periphery on given wheel mounts and wheel rim designs.

Corresponding profilings whose transmission/contact surfaces take up the preload force created by the central thread connection are provided as the torque transmitting and centering means on the part of the wheel mount and the wheel or the wheel rim. The profiling in the form of a crown gear, also known in technical circles as "Voith-Hirth spur gear," can be used in an advantageous manner. [Additional embodiments of the inventions are derived from claim 1 and the following subclaims as well as the description of figures.]

BRIEF DESCRIPTION OF THE DRAWINGS

The following figures show by way of examples and illustrations a number of possibilities for arranging a connection in accordance with the invention.

It is shown by.

DETAILED DESCRIPTION OF PREFERRED EMBODIMENTS OF THE INVENTION

These drawings show examples of connections between a wheel and a wheel mount according to this invention. The term wheel as used below is understood to refer to the combination of the wheel rim and tire (pneumatic), with the wheel rim being designed in one part or, as shown here, in multiple parts. The wheel mount refers to the part which is mounted rotatably in the wheel carrier and has a corresponding adapter for the wheel mount. Wheel loads (symbolized by the force arrows F in FIG. 3) as well as braking forces and optionally driving forces (symbolized by the force arrow M in FIG. 3) are transmitted to the wheel by way of the wheel mount.

Figure 1:
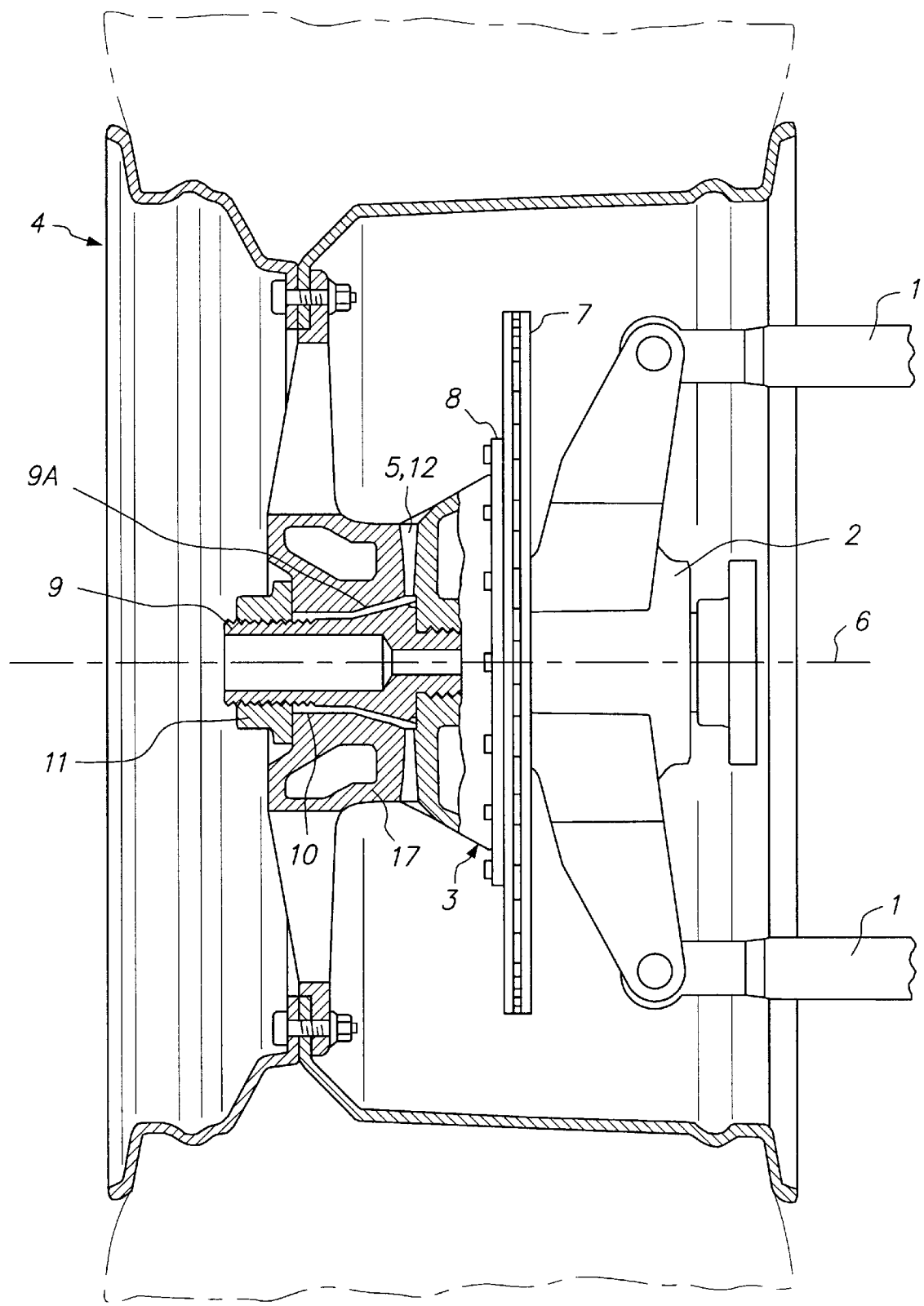
FIG. 1: a section through a first embodiment of a wheel mount according to this invention.

FIG. 1 shows schematically a wheel carrier 2, which is connected by pull rods 1 to a vehicle chassis (not shown), with a wheel mount 3 rotatably mounted by means of suitable roller bearings (not shown) in the wheel carrier. The wheel mount 3 is enlarged radially in the area near the wheel and has a profiling 5, for example, in the form of a crown gear arranged coaxially and perpendicular to the axis of rotation 6 on the end facing the wheel 4. The profiles are in the form of intermeshing teeth, the teeth of each of the hub 17 and the mount 3 projecting axially and being spaced circumferentially apart.

As shown in FIG. 1, the area having the profiling 5 may have a suitable flange extension 8 for attaching a brake disk 7. Coaxially with the axis of rotation 6, a wheel mounting bolt 9 which passes through a centerhole 10 in wheel 4 is provided in wheel mount 3. Wheel 4 is preloaded in the direction of wheel mount 3 by a nut 11 screwed onto the end of a wheel mounting bolt 9 such that a profiling 12 on the wheel side gears into the corresponding profiling 5 on the wheel mount side. The engagement benefits from a preliminary centering while shifting the wheel 4 onto the mounting bolt 9, due to a conical portion 9A of the mounting bolt 9. The preload force of the wheel 4 is directed into the wheel mount 3 through the interlocking profiling 5 and 12, i.e., from the wedge-shaped faces 13 of the profilings 5, 12, e.g., the crown gear, and taken up in such a way that the wheel 4 is necessarily positioned and fixed in a defined position with respect to the three space coordinates due to the wedge-shaped guide and supporting faces and aligned with the wheel mount 3 with regard to the axis of rotation 6.

Figure 2:
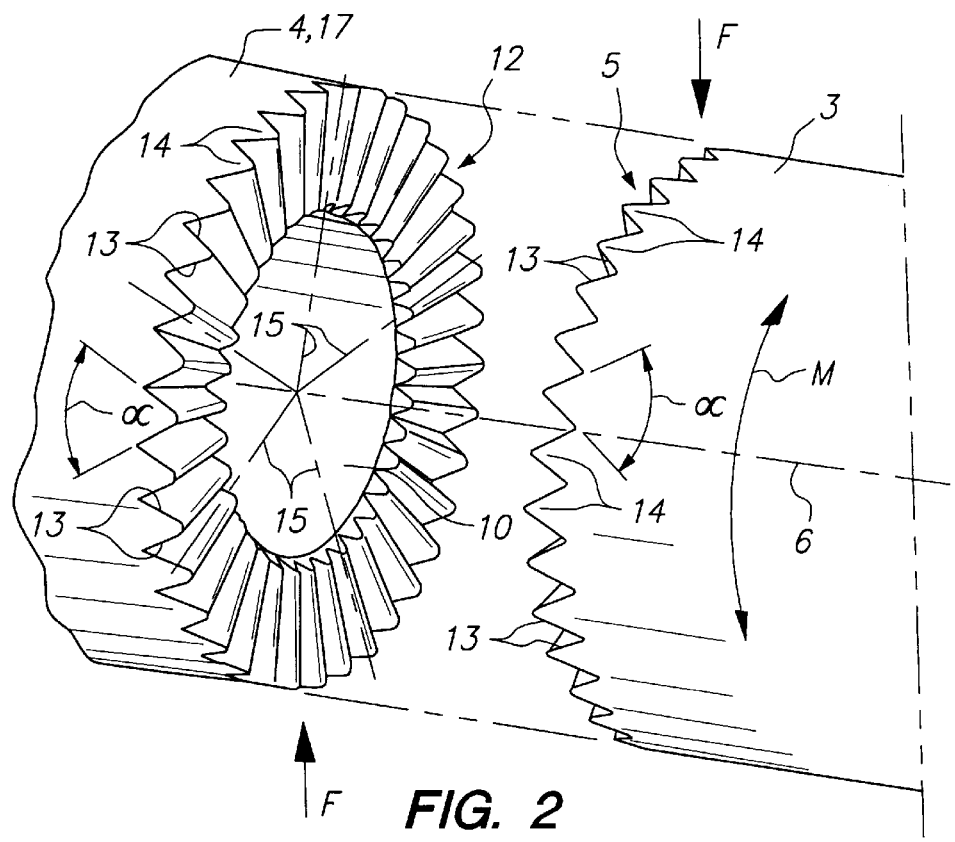
FIG. 2: a detailed perspective view of a gear tooth area of a wheel mount according to this invention.

FIG. 2 shows in a perspective view, for example, two corresponding crown gears 5, 12 suitable for being used according to this invention, with one being provided for the wheel 4 and the other for the wheel mount 3. It can be seen clearly that the gearing is formed by triangular profile sections 14 whose longitudinal axes 15 intersect in the centerline or axis of rotation 6. The wedge angle a of profile sections 14 remains constant with respect to the longitudinal axis 15. Other profiling configurations are obviously also conceivable without going beyond the scope of the present invention.

Figure 3:
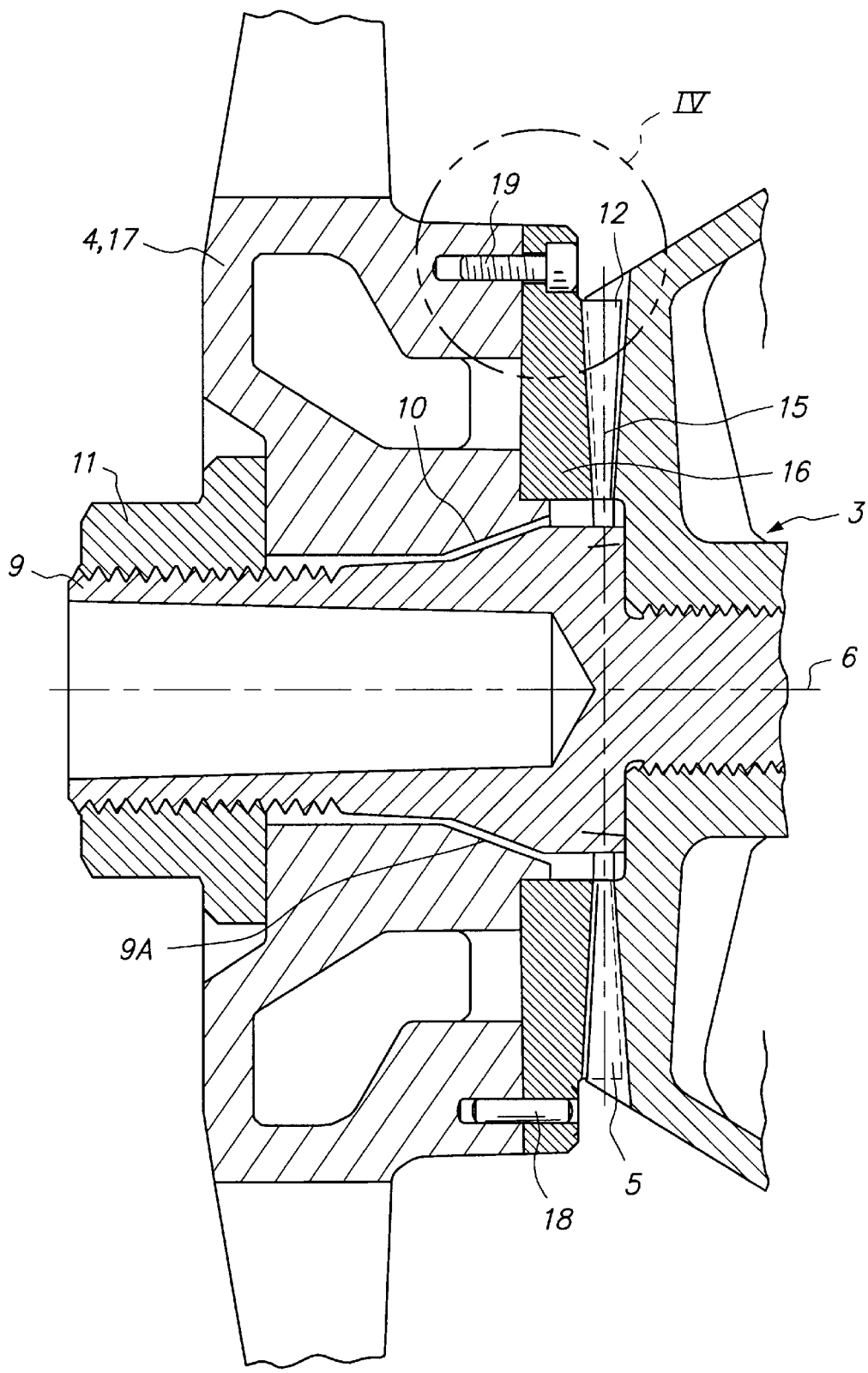
FIG. 3: a section through another embodiment according to FIG. 1.

FIG. 3 shows one embodiment where the profiling 12 on the wheel side is designed as a separate part 16. This solution is recommended when, for lack of space, the manufacturing of the gearing directly in the material of the wheel rim or in the wheel mount is impossible or difficult, or the concerned material does not have the required strength values.

Part 16 equipped with the gearing is attached, for example, by a dowelpin/screw connection on wheel rim 17, with the dowelpins 18 taking up without any play the torque-induced shear forces between the part 16 having the profiling 12 and the wheel rim 17, and the screws 19 securing the part 16 essentially axially on the wheel rim 17 as soon as the axially acting preloading means 9, 11 has been released.

Figure 4:
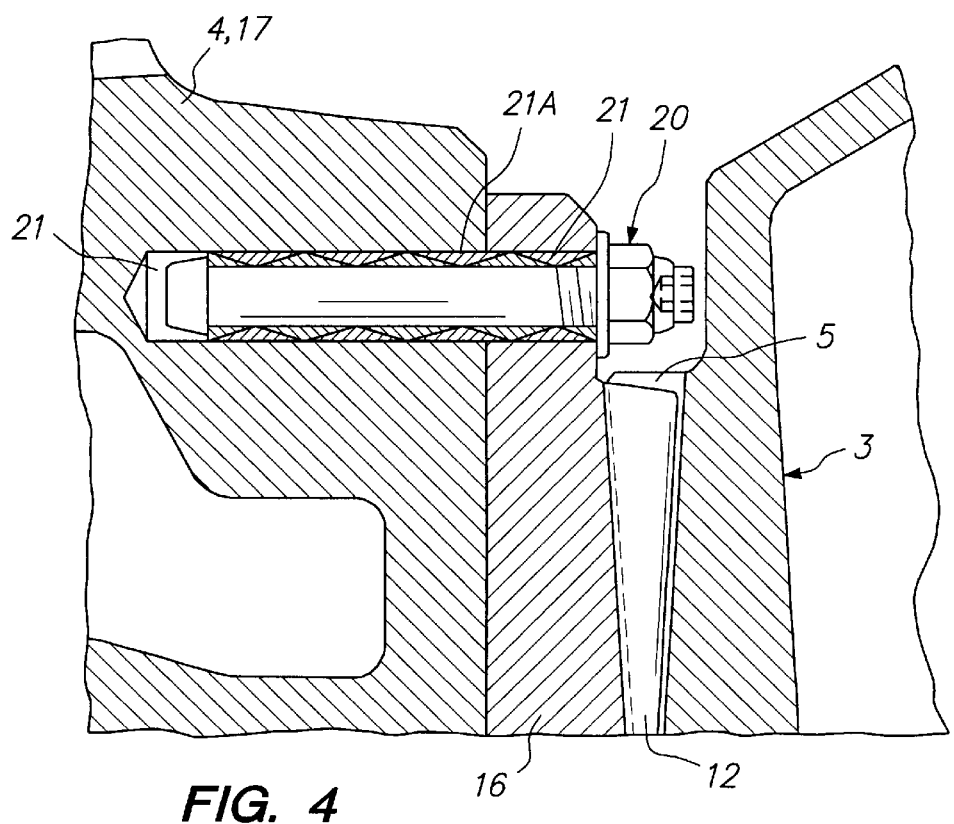
FIG. 4: another variant of a connection according to detail IV in FIG. 3 in an enlarged diagram.

The wheel mounting according to FIG. 4 can be regarded as particularly favorable. In FIG. 4, the part 16 having the profiling 12 is attached by bolts with a variable diameter, so-called "expandable diameter bolts" (e.g., made by Shur-Lok corporation). These bolts 20—shown here in the version of blind bolts - are inserted into the aligned drillholes 21 of the wheel rim 17 and the part 16 having the profiling 12 and are braced like an expansion bolt. The bolt 20 takes charge of the aptitudes of the dowel pin 18 as in FIG. 3. Since the axial fixation of wheel 4 when mounted is accomplished by the prestressing means 9, 1 1, the friction generated by the blind bolts 20 is sufficient to secure part 16 on the wheel rim 17 when wheel 4 is taken off. Optionally, instead of blind bolts 20, positive-locking feed-throughbolts with a variable diameter may be utilized.

The embodiments described above and illustrated in FIGS. 1 through 4 are not to be understood as having a restrictive effect on this invention. Other possible designs may be derived [from claim 1 and the following claims].

What is claimed is:

1. A wheel assembly for vehicles comprising:
   a wheel hub for holding a tire, and
   a wheel mount adapted to mount the wheel hub to a vehicle and to transmit torque to the wheel hub about a longitudinal axis;
   the wheel hub and the wheel mount including intermeshing profiles for transmitting torque from the wheel mount to the wheel hub, the profiles of each of the wheel hub and the wheel mount projecting axially and being spaced apart in a circumferential direction with reference to the longitudinal axis, the profiles being wedge-shaped as the assembly is viewed in longitudinal cross section, wherein the intermeshing profiles define a sole means for retaining the wheel hub radially centered about the longitudinal axis.

2. The wheel assembly according to claim 1, further including a wheel mounting bolt extending through the wheel hub along the longitudinal axis and including a first end threadedly secured in the wheel mount, and a nut screwed onto a second end of the bolt for forcing the profiles of the wheel hub and the profiles of the wheel mount together in the axial direction to create a pre-load.

3. The wheel assembly according to claim 2 wherein the wheel mounting bolt includes a conical portion for guiding the wheel hub into a preliminary generally centered position during axial insertion of the profiles of the wheel hub into meshing relationship with the profiles of the wheel mount.

4. The wheel according to claim 1 wherein the profiles of each of the wheel hub and the wheel mount define a crown gear.

5. The wheel according to claim 1 wherein the profiles of each of the wheel hub and the wheel mount comprise a Gleanson-Curvic coupling.

6. The wheel assembly according to claim 1 wherein the profiles of at least one of the wheel hub and the wheel mount extend for 360 degrees around the longitudinal axis.

7. The wheel assembly according to claim 1 wherein the profiles of at least one of the wheel hub and the wheel mount are formed as a separately attached element to the respective wheel hub or the wheel mount.

8. The wheel assembly according to claim 7 wherein the separately attached element includes a mechanical guide for guiding the mounting of the separately attached element in an axial direction.

9. The wheel assembly according to claim 1 wherein the profiles of the wheel hub and the wheel mount are of one piece integral construction with the rest of the wheel hub and the wheel mount, respectively.

* * * * *